(12) United States Patent
Nomura et al.

(10) Patent No.: US 7,734,085 B2
(45) Date of Patent: Jun. 8, 2010

(54) IMAGE DATA DELIVERY SYSTEM, IMAGE DATA TRANSMITTING DEVICE THEREOF, AND IMAGE DATA RECEIVING DEVICE THEREOF

(75) Inventors: Toshio Nomura, Hachioji (JP); Hiroyuki Katata, Chiba (JP); Norio Ito, Chiba (JP); Tadashi Uchiumi, Urayasu (JP); Shuichi Watanabe, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 1176 days.

(21) Appl. No.: 10/519,154

(22) PCT Filed: Jun. 30, 2003

(86) PCT No.: PCT/JP03/08302

§ 371 (c)(1),
(2), (4) Date: Dec. 27, 2004

(87) PCT Pub. No.: WO2004/004350

PCT Pub. Date: Jan. 8, 2004

(65) Prior Publication Data

US 2005/0248802 A1    Nov. 10, 2005

(30) Foreign Application Priority Data

Jun. 28, 2002    (JP) .............................. 2002-189470

(51) Int. Cl.
*G06K 9/00* (2006.01)
*G06K 9/32* (2006.01)
(52) U.S. Cl. ........................................ 382/154; 382/294
(58) Field of Classification Search .................. 382/154
See application file for complete search history.

(56) References Cited

U.S. PATENT DOCUMENTS 5,864,337 A * 1/1999 Marvin ..................... 715/708

(Continued)

FOREIGN PATENT DOCUMENTS

EP    0 888 018 A1    12/1998

(Continued)

OTHER PUBLICATIONS

Weems C. C. Jr., "The second generation image understanding architecture and beyond" Computer Architectures for Machine Perception, 1993. Proceedings New Orleans, LA, USA Dec. 15-17, 1993, Los Alamitos, CA, USA, IEEE Comput. Soc, Dec. 15, 1993, pp. 276-285.

(Continued)

*Primary Examiner*—Bhavesh M Mehta
*Assistant Examiner*—David P Rashid
(74) *Attorney, Agent, or Firm*—Birch, Stewart, Kolasch & Birch, LLP

(57) ABSTRACT

A server (1) analyzes request information from a client (11) by a request analyzer (4) and selects necessary image data from multiple viewpoint image data (2) to be output to an image generator (3). The image data is generated by interpolation and output to an image synthesizer (5), in which a plurality of images data is synthesized in a form suitable for encoding. An encoder (6) encodes the image data and transfers it to a network (7). The client (11) receives the encoded image data, decodes the data through a decoder (12) and outputs the decoded image data to an image processor (13), where it is converted into a stereoscopic display format and displayed on a display unit (14). The client (11) includes an input unit (16) for changing the viewpoint, and transmits the request information of viewpoint alternation to the network (7) by a request output unit (15).

9 Claims, 14 Drawing Sheets

U.S. PATENT DOCUMENTS

| | | | |
|---|---|---|---|
| 6,144,701 A * | 11/2000 | Chiang et al. | 375/240 |
| 6,241,609 B1 * | 6/2001 | Rutgers | 463/31 |
| 6,285,392 B1 | 9/2001 | Satoda et al. | |
| 6,525,732 B1 * | 2/2003 | Gadh et al. | 345/428 |
| 6,573,912 B1 * | 6/2003 | Suzuki et al. | 715/757 |
| 6,631,205 B1 * | 10/2003 | Melen et al. | 382/154 |
| 6,762,789 B1 | 7/2004 | Sogabe et al. | |
| 6,803,912 B1 * | 10/2004 | Mark et al. | 345/427 |
| 2002/0030675 A1 | 3/2002 | Kawai | |
| 2003/0108236 A1 * | 6/2003 | Yoon | 382/154 |
| 2003/0122949 A1 * | 7/2003 | Kanematsu et al. | 348/333.01 |
| 2004/0032649 A1 * | 2/2004 | Kondo et al. | 359/364 |

FOREIGN PATENT DOCUMENTS

| | | |
|---|---|---|
| EP | 1 117 256 A1 | 7/2001 |
| JP | 1-107247 A | 4/1989 |
| JP | 7-274211 A | 10/1995 |
| JP | 9-200715 A | 7/1997 |
| JP | 10-178594 A | 6/1998 |
| JP | 11-225160 A | 8/1999 |
| JP | 2000-165831 A | 6/2000 |
| JP | 2001-8232 A | 1/2001 |
| KR | 2001-0100539 A | 11/2001 |
| WO | WO-01/05154 A1 | 1/2001 |

OTHER PUBLICATIONS

Avaro O. et al., "The MPEG-4 systems and description languages: A way ahead ausio visual information representation" Signal Processign. Image Communication, Elsevier Science Publishers, Amsterdam, NL, vol. 9, No. 4, May 1997, pp. 385-431.

Tsunashima, Nobuhiro et al, "Construction of Intermediate Multi-viewpoint Images from a Set of Stereo Image Pair Taking Occulusion into Consideration", 3D Image Conference '95, Jul. 6, 1995, pp. 174-177 (*with a partial translation thereof*).

Azuma, Takeo et al., "Disparity Estimation with Edge Information for Synthesizing Intermediate View Images," 3D Image Conference '95, Jul. 6, 1995, pp. 190-195 (*with a partial translation thereof*).

\* cited by examiner (a)  (b)

| Management information | C1 | C2 | C3 | ... |
|---|---|---|---|---|

FIG. 13A

|  | Number of bytes from the front | Pointer to random access table |
|---|---|---|
| C1 | B1 | P1 |
| C2 | B2 | P2 |
| C3 | B3 | P3 |
| C4 | B4 | P4 |

FIG. 13B

| Time | Number of bytes from the front of each camera image data | Number of bytes to the latest I-frame |
|---|---|---|
| $t_1$ | $Bt_1$ | $It_1$ |
| $t_2$ | $Bt_2$ | $It_2$ |
| $t_3$ | ⋮ | ⋮ |

IMAGE DATA DELIVERY SYSTEM, IMAGE DATA TRANSMITTING DEVICE THEREOF, AND IMAGE DATA RECEIVING DEVICE THEREOF

BACKGROUND OF THE INVENTION

1. Field of the Invention

The present invention relates to an image data distribution system for distributing image data and an image data transmitting apparatus and image data receiving apparatus for the system.

2. Description of the Related Art

Conventionally, there have been proposed devices for displaying a stereoscopic image viewed from an arbitrary viewpoint using multiple viewpoint images taken by a plurality of cameras. One example of such a display device is shown in FIG. 16. This device includes: an input unit 95 for setting the left and right eye viewpoints; a computer 91 connected to input unit 95 to generate image data that constitutes two images viewed from the left and right eye viewpoints; and a stereoscopic display 98 that is connected to computer 91 to receive image data of the two images and makes stereoscopic display by synthesizing the data through an interior circuit thereof.

Computer 91 comprises: a memory 92 for storing multiple viewpoint image data; a CPU 93 for implementing a process of generating image data that constitutes two images; an input/output interface 94 connected to stereoscopic display 98 and input unit 95 for controlling the input values from input unit 95 and the input and output of image data; and a bus 96 for mutually connecting CPU 93, memory 92 and input/output interface 94.

From the multiple viewpoint image data stored in memory 92, one desired set of image data is selected while its left and right eye viewpoints for implementing stereoscopic display are designated by using the input unit 95. In this case, it is judged whether the image data viewed from the left eye viewpoint is present in the multiple-view data. If the data is present, the image data is output through input/output interface 94. If the data is not present, the image data that is viewed from the left eye viewpoint is generated by an interpolating process using the image data constituting a predetermined plurality of images taken from the viewpoints adjacent to the left eye viewpoint, and the generated data is output through input/output interface 94. A similar process is carried out from the right eye viewpoint.

However, since the conventional technology needs large enough memory and a high-performance CPU, it suffers from the problem of being impossible for a terminal such as a mobile terminal, which has only limited memory and a CPU with a limited processing performance, to realize the technology.

Further, since it is assumed in the conventional technology that a special stereoscopic display is directly connected to the computer, no consideration is taken for efficient transmission of image data, so that it is impossible to deal with the case where various kinds of stereoscopic displays are connected through a network.

The present invention has been devised under the above circumstances, it is therefore an object of the present invention to provide an image data distribution system, its image data transmitting apparatus and image data receiving apparatus, which enable observation of a stereoscopic image viewed from a viewpoint even with a mobile terminal or the like.

Another object is to enable identical original image data to be used for observations of a stereoscopic image viewed from arbitrary viewpoints through various kinds of stereoscopic displays connected by a network while realizing efficient transmission of stereoscopic image data.

DISCLOSURE SUMMARY OF INVENTION

In order to achieve the above objects, the image data distribution system according to the present invention and its image data transmitting apparatus and image data receiving apparatus employ the following means.

Specifically, an image data distribution system of the present invention includes: a request information receiving means for receiving client's request information transmitted by way of a network; a request information analyzing means for analyzing the request information received by the request information receiving means; a multiple viewpoint image supply means which selects necessary image data from coded and stored multiple viewpoint image data of images taken by a plurality of cameras, based on viewpoint information from the request information analyzed by the request information analyzing means and decodes and supplies selected data; an image generating means which, based on image data supplied from the multiple viewpoint image supplying means, generates image data of an image viewed from a predetermined viewpoint in conformity with the request information; an image synthesizing means for synthesizing a plurality of images data generated by the image generating means, based on display unit information from the request information; a coding means for coding image data synthesized by the image synthesizing means; a transmitting means for transmitting coded image data by the coding means to the network; a receiving means for receiving the coded image data via the network; a decoding means for decoding the coded image data received by the receiving means; an image processing means for processing decoded image data by the decoding means so as to be display able on a display means; the display means for displaying image data processed by the image processing means; a request information input means for allowing input of the client's request information; and a request information transmitting means for transmitting the request information to the network.

Also, an image data transmitting apparatus of the present invention includes: a request information receiving means for receiving client's request information transmitted by way of a network; a request information analyzing means for analyzing the request information received by the request information receiving means; a multiple viewpoint image supply means which selects necessary image data from coded and stored multiple viewpoint image data of images taken by a plurality of cameras, based on viewpoint information from the request information analyzed by the request information analyzing means and decodes and supplies selected data; an image generating means which, based on image data supplied from the multiple viewpoint image supplying means, generates image data of an image viewed from a predetermined viewpoint in conformity with the request information; an image synthesizing means for synthesizing a plurality of images data generated by the image generating means, based on display unit information from the request information; a coding means for coding image data synthesized by the image synthesizing means; and a transmitting means for transmitting coded image data by the coding means to the network.

Further, the image data distribution system of the present invention may further include a management information adding means for adding management information for enabling access to the image data of individual viewpoints and random access, to the multiple viewpoint image data.

Moreover, the image data transmitting apparatus of the present invention may further include a management information adding means for adding management information for enabling access to the image data of individual viewpoints and random access, to the multiple viewpoint image data.

Still, an image data distribution system of the present invention includes: a request information receiving means for receiving client's request information transmitted by way of a network; a request information analyzing means for analyzing the request information received by the request information receiving means; a multiple viewpoint image supply means for supplying multiple viewpoint image data; an image generating means which, based on viewpoint information from the request information analyzed by the request information analyzing means, receives input of necessary image data from the multiple viewpoint image supply means and generates image data of an image viewed from a predetermined viewpoint in conformity with the request information; an image synthesizing means for synthesizing a plurality of images data generated by the image generating means, based on display unit information from the request information; a coding means for coding image data synthesized by the image synthesizing means; a transmitting means for transmitting coded image data by the coding means to the network; a receiving means for receiving the coded image data via the network; a decoding means for decoding the coded image data received by the receiving means; an image processing means for processing decoded image data by the decoding means so as to be display able on a display means; the display means for displaying image data processed by the image processing means; a request information input means for allowing input of the client's request information; a request information transmitting means for transmitting the request information to the network; and a judgement means for judging whether the received image data is of two-dimensional image data or stereoscopic image data.

Another image data receiving apparatus of the present invention includes: a receiving means for receiving coded image data by way of a network; a decoding means for decoding the coded image data received by the receiving means; an image processing means for processing decoded image data by the decoding means so as to be display able on a display means; the display means for displaying image data processed by the image processing means; a request information input means for allowing input of request information of a client; a request information transmitting means for transmitting the request information to the network; and a judgement means for judging whether the received image data is of two-dimensional image data or stereoscopic image data.

Next, an image data distribution system of the present invention includes: a request information receiving means for receiving client's request information transmitted by way of a network; a request information analyzing means for analyzing the request information received by the request information receiving means; a multiple viewpoint image supply means for supplying multiple viewpoint image data; an image generating means which, based on viewpoint information from the request information analyzed by the request information analyzing means, receives input of necessary image data from the multiple viewpoint image supply means and generates image data of an image viewed from a predetermined viewpoint in conformity with the request information; an image synthesizing means for synthesizing a plurality of images data generated by the image generating means, based on display unit information from the request information; a coding means for coding image data synthesized by the image synthesizing means; a transmitting means for transmitting coded image data by the coding means to the network; a receiving means for receiving the coded image data via the network; a decoding means for decoding the coded image data received by the receiving means; an image processing means for processing decoded image data by the decoding means so as to be display able on a display means; the display means for displaying image data processed by the image processing means; a request information input means for allowing input of the client's request information; a request information transmitting means for transmitting the request information to the network; and an identification information adding means for adding to the image data to be transmitted a piece of information that indicates whether the image data is of two-dimensional image data or stereoscopic image data.

Further, an image data transmitting apparatus of the present invention includes: a request information receiving means for receiving client's request information transmitted by way of a network; a request information analyzing means for analyzing the request information received by the request information receiving means; a multiple viewpoint image supply means for supplying multiple viewpoint image data; an image generating means which, based on viewpoint information from the request information analyzed by the request information analyzing means, receives input of necessary image data from the multiple viewpoint image supply means and generates image data of an image viewed from a predetermined viewpoint in conformity with the request information; an image synthesizing means for synthesizing a plurality of images data generated by the image generating means, based on display unit information from the request information; a coding means for coding image data synthesized by the image synthesizing means; a transmitting means for transmitting coded image data by the coding means to the network; and an identification information adding means for adding to the image data to be transmitted a piece of information that indicates whether the image data is of two-dimensional image data or stereoscopic image data.

Moreover, an image data receiving apparatus of the present invention includes: a receiving means for receiving coded image data by way of a network; a decoding means for decoding the coded image data received by the receiving means; an image processing means for processing decoded image data by the decoding means so as to be display able on a display means; the display means for displaying image data processed by the image processing means; a request information input means for allowing input of request information of a client; a request information transmitting means for transmitting the request information to the network; and an identification information adding means for adding to the received image data a piece of information that indicates whether the image data is of two-dimensional image data or stereoscopic image data.

As has been described heretofore, since the above configuration makes it unnecessary to provide large amounts of memory and a high-performance CPU on the client side, the invention has the effect of enabling observation of a stereoscopic image viewed from an arbitrary viewpoint even with a mobile terminal and the like.

The present invention also has the effect of enabling use of an identical original image data to provide observations of a stereoscopic image viewed from arbitrary viewpoints through various types of stereoscopic displays that are connected by way of a network.

BRIEF DESCRIPTION OF DRAWINGS

FIGS. 13A and 13B are charts showing one example of management information;

DETAILED DESCRIPTION OF THE INVENTION

The embodiment of an image data distribution system according to the present invention will be described with reference to the drawings.

Figure 1:
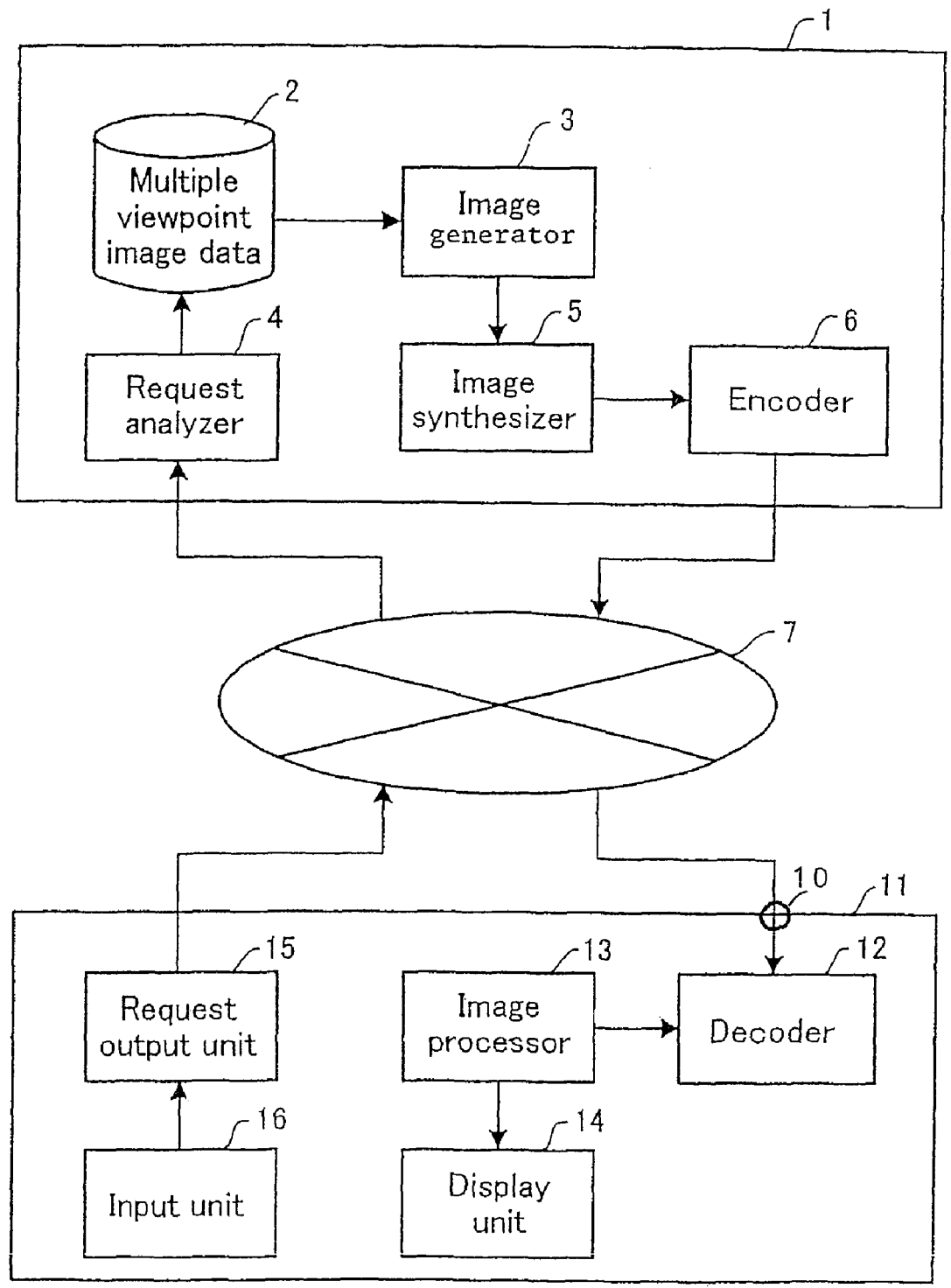
FIG. 1 is a block diagram showing an embodiment of an image data distribution system according to the present invention.

FIG. 1 is a block diagram showing the embodiment of an image data distribution system according to the present invention.

A server 1 (image data transmitting apparatus) and a client 11 (image data receiving apparatus) are connected to each other by way of a network 7. Server 1 has stored (recorded) multiple viewpoint image data 2. When client 11 transmits request information to server 1, the client is able to implement stereoscopic display of an image viewed from a desired viewpoint on a display unit 14.

Here, the multiple viewpoint image data has not been necessarily stored (recorded) previously in server 1, but may be supplied in real time from without.

Server 1 analyzes the request information transmitted from client 11 by a request analyzer 4 (request information analyzing means (including request information receiving means)) and selects the necessary image data from multiple viewpoint image data 2 (multiple viewpoint image supply means) to output it to an image generator 3 (image generating means) where image data for the requested viewpoint (viewpoint information) is generated by interpolation to be output to an image synthesizer 5 (image synthesizing means). In image synthesizer 5, a plurality of supplied images data are synthesized in a form (format based on the display unit information) suitable for encoding to be output to an encoder 6 (coding means). In encoder 6, the supplied image data is encoded at a suitable bit rate to be transmitted to network 7 (transmitting means).

Client 11 receives the coded image data (via receiving means 10), and decodes the data through a decoder 12 (decoding means) and outputs the decoded image data to an image processor 13 (image processing means), where the image data is converted into an appropriate form in conformity with a stereoscopic display format so that the image data is displayed on a display unit 14 (display means). Client 11 also includes an input unit 16 (request information input means) for change of the viewpoint, and transmits the request information of viewpoint alternation to network 7 by way of a request output unit 15 (request information transmitting means).

Now, server 1 and client 11 will be described in detail.

Figure 2A:
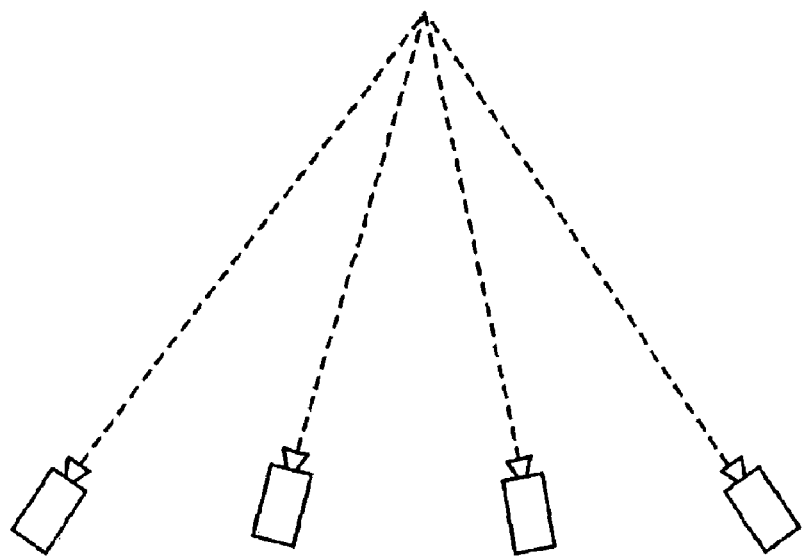
FIGS. 2A and 2B are illustrations showing layouts of a plurality of cameras for preparing multiple-view image data.
Figure 2B:
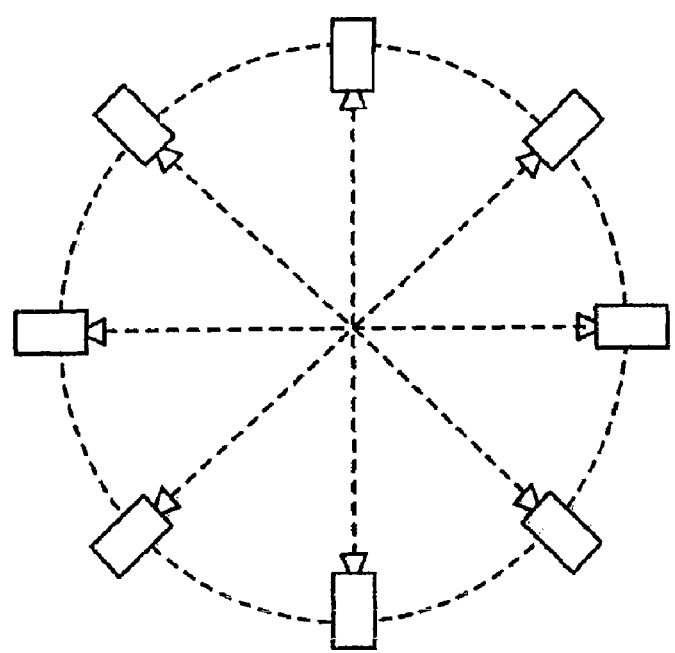

Multiple viewpoint image data 2 is formed of a set of images data taken by a plurality of cameras. The plurality of cameras are typically laid out as shown in FIG. 2A so that the optical axes of the plurality of cameras intersect at one point. As a special example, the cameras may be arranged on the circumference of a circle so that the optical axes of the cameras are directed to the center of the circle, as shown in FIG. 2B. In either case, the cameras are not necessarily arranged equi-distantly, but may be laid out in some parts densely and others sparsely. The information as to how the cameras are allocated is also recorded together with the image data. This allocation information is used to determine the image data of which cameras should be used when image generator 3 generates the image data from a designated viewpoint by interpolation based on the request information from client 11.

Figure 3A:
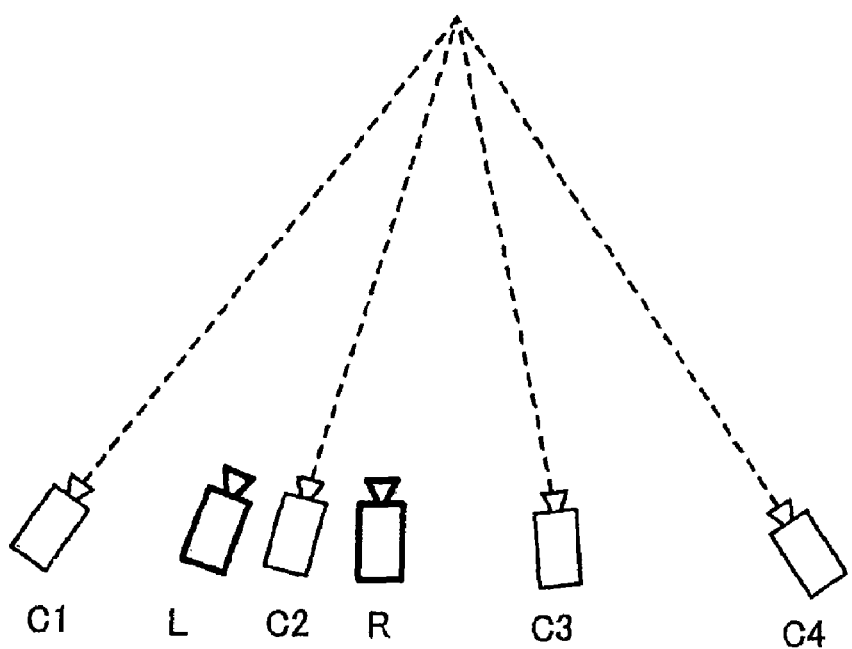
FIGS. 3A and 3B are illustrations showing the left eye viewpoint L and the right eye viewpoint R for which image data is generated by interpolation.

Next, description will be made about the necessary camera image data when the image of the requested viewpoint is generated by interpolation. In the example shown in FIG. 3A, the left eye viewpoint L and right eye viewpoint R are designated as illustrated with respect to cameras C1 to C4. In this case, the images of data from C1 and C2 are used to generate the image data for left eye viewpoint L and the images of data from C2 and C3 are used to generate the image data for right eye viewpoint R. Similarly, in the example shown in FIG. 3B, the layout of cameras C1 to C4 and the requested left eye viewpoint L and right eye viewpoint R are positioned as illustrated. In this case, both the image data for left eye viewpoint L and the image data for right eye viewpoint R are generated based on the images of data from C1 and C2. Though four cameras are used in the examples in FIGS. 3A and 3B, the number of cameras is not limited to four.

Generation of images from an intermediate viewpoint by interpolation is a known technology, and is disclosed in detail in, for example, "Tsunashima et al.: generation of intermediate image data from a two-view stereoscopic image data taking occlusion into consideration, 3D Image Conference '95, pp. 174-177 (1995)", and "Azuma et al.: parallax estimation based on the edge information for generation of intermediate image data, 3D Image Conference '95, pp. 190-194 (1995)", and others.

Figure 4:
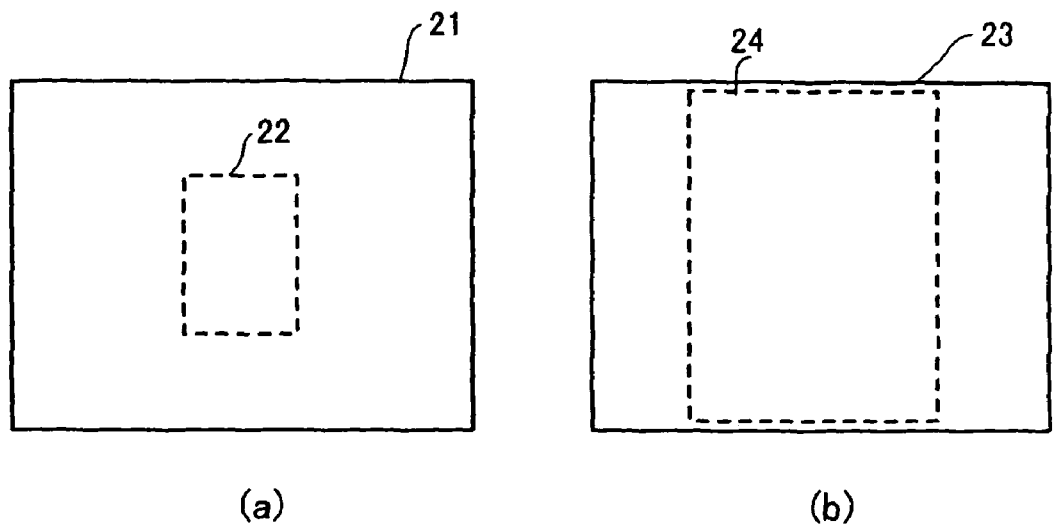
FIGS. 4A and 4B are illustrations showing areas to be cut out from the generated image data, depending on the resolution of a display unit.

When the necessary viewpoint image data has been generated at image generator 3, image synthesizer 5 implements an extraction process of image data in an amount for the requested resolution. In FIG. 4A, the size of the generated image data 21 is assumed to be equal to the size of the image taken by the camera, and the resolution required for display on client 11 is shown by an area 22. In FIG. 4A, only part of the generated image data is cut out. Alternatively, as shown in FIG. 4B, instead of cutting out an image in the resolution required for display on client 11, the maximum area 24 capable of being cut out while keeping the display aspect may be cut out from the generated image data 23 (which is assumed to be the same size as the image taken by the camera), then may be reduced to the required resolution. Also, image generator 3 may be adapted to generate only the necessary amount of image data for the required resolution.

Figure 5:
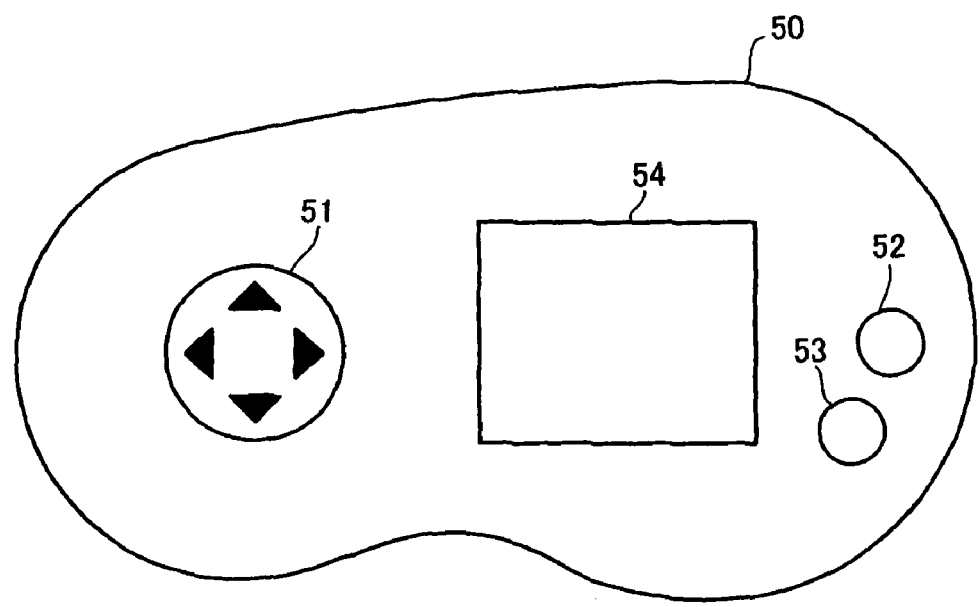
FIG. 5 is an illustrative view showing a mobile terminal to be a client.

FIG. 5 is an illustrative view showing a mobile terminal 50 to be a client 11. The terminal includes a stereoscopic display 54, a four-way arrow key 51 for moving the viewpoint up, down, left and right and keys 52 and 53 for moving the viewpoint forward and backward. Though unillustrated, the terminal also has a communication means for making communication with the server.

Figure 6A:
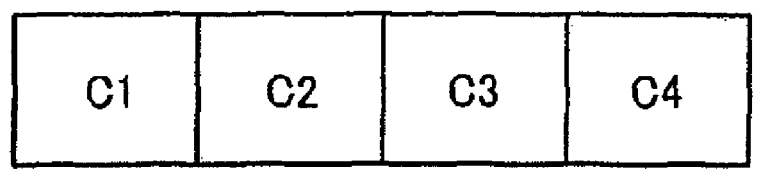
FIGS. 6A, 6B, and 6C are illustrations showing examples of states of stored data of multiple-view image data.
Figure 6B:
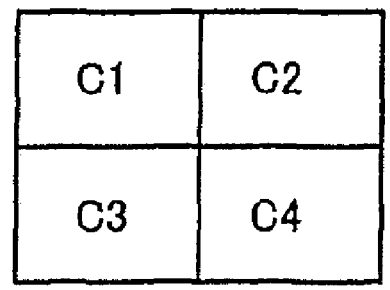
Figure 6C:
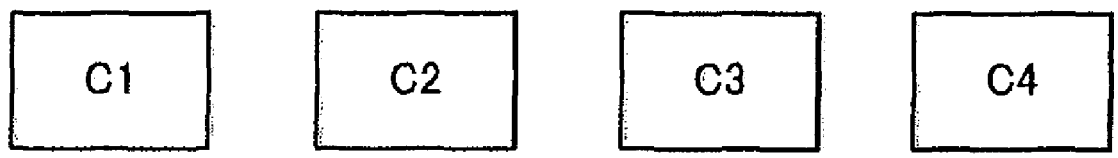

FIGS. 6A, 6B, and 6C show examples of storage states of multiple viewpoint image data 2. Because moving picture data taken by a plurality of cameras need to be temporally synchronized to each other, the plurality of images data C1 to C4 taken by different cameras may be stored in such a manner as to join them abreast and form a piece of image data made of one image, as shown in FIG. 6A. This format assures that the images data C1 to C4 contained in the image data of the single image were taken at the same time, leading to easy time management. The way of joining is not limited to a line abreast as shown in FIG. 6A but the images may be joined as shown in FIG. 6B, for example.

Figure 3B:
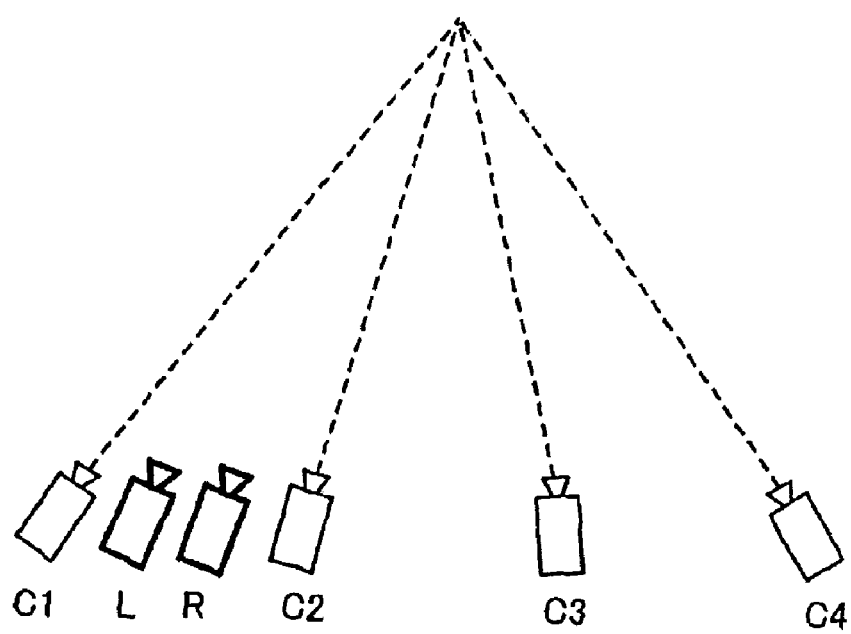

In contrast, as shown in FIG. 6C, a format of separately storing the images of data C1 to C4 taken by different cameras may be also considered. The advantage of this method is that, when camera images C1 and C2 alone are needed as shown in FIG. 3B in order to generate the image data from the requested viewpoint, these can be easily picked up.

Figure 8A:
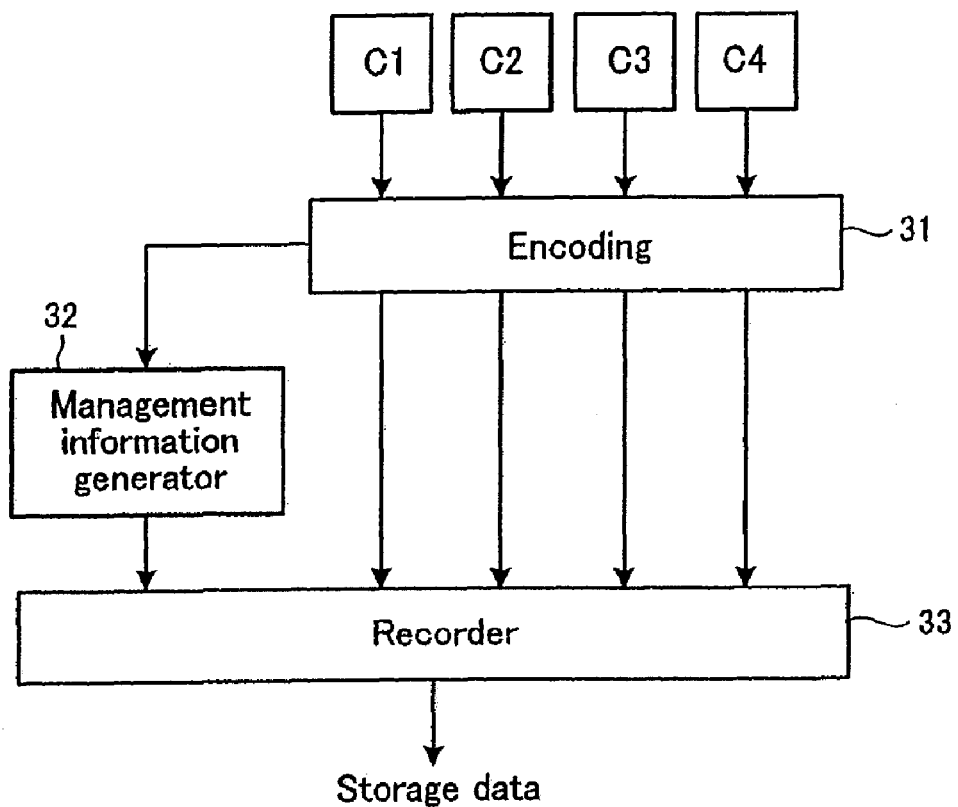
FIGS. 8A and 8B are diagrams showing storage and extraction of multiple-view image data.

Multiple viewpoint image data 2 may be stored either by being compressed or non-compressed. Here, referring to FIGS. 8A and 8B, description will be made about a case where individual pieces of camera image data which are given separately in the manner as shown in FIG. 6C are stored after being data compressed. In this case, images of data C1 to C4 taken by the individual cameras are input to an encoder 31 as shown in FIG. 8A. Encoder 31 encodes each image data and outputs the necessary information (frame type, generation bit count, etc.) for generating management information, to a management information generator 32. In a recorder 33, the coded image data and the management information are recorded as the storage data (management information adding means). The detail of the management information and storage format will be described later.

Figure 8B:
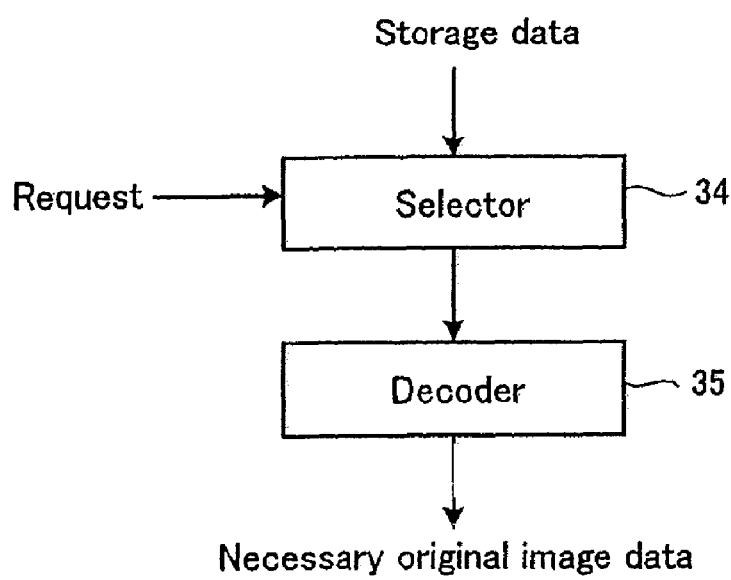

When the storage data which has been recorded in the manner shown in FIG. 8A is used as the multiple viewpoint image data, the data needs to be decoded so as to be handled by image generator 3. In this case, as shown in FIG. 8B, a selector 34, in accordance with the request from the client, selects only the necessary image data from the stored data and outputs to a decoder 35 where the data is decoded, whereby it is possible to obtain the necessary and sufficient original image data (the image data to be used by image generator 3). In this process, in order to extract the necessary part quickly, the management information recorded together with image data is utilized.

Figure 7A:
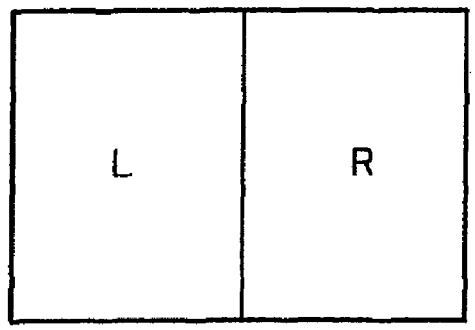
FIGS. 7A, 7B, and 7C are illustrations showing examples of states of generated image data.
Figure 7B:
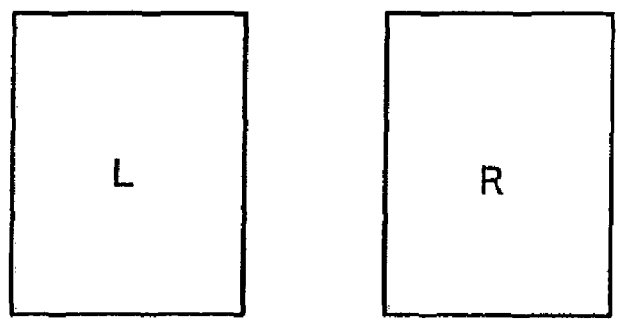
Figure 7C:
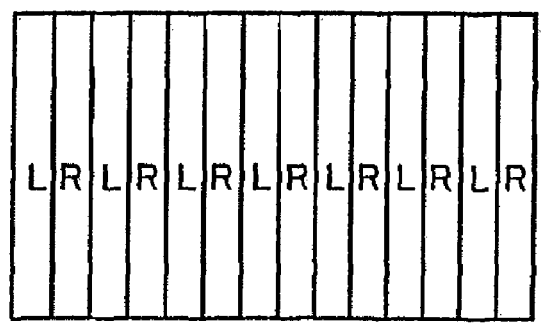

FIGS. 7A, 7B, and 7C show examples of image data states generated by image synthesizer 5. Though the left eye viewpoint image data L and the right eye viewpoint image data R can be encoded as separate pieces of image data as shown in FIG. 7B, it is preferred that both images of data are joined side by side (or up and down) into a piece of synthesized image data formed of a single image then the joined image data is encoded. Formation of the image data composed of a single image as shown in FIG. 7A is able to assure the synchronism between the left eye viewpoint image data L and the right eye viewpoint image data R, leading to easy time management. Particularly, when a coding scheme entailing frame skipping such as MPEG-4 is used, it is possible to prevent occurrence of such a situation where, at a certain moment, the frame of the left eye viewpoint image data L is present whereas the frame of the right eye viewpoint image data R is not present. Further, since the image data is rate-controlled as a single image, both the left eye viewpoint image L and the right viewpoint image R can be kept substantially equal in image quality. When the images are encoded as separate pieces of image data, depending on the rate control result there occurs a case where on extraction of a frame at a certain moment the image quality of the left eye viewpoint image L is good while the image quality of the right eye viewpoint image R is bad. In such a case, the resultant stereoscopic display presents poor quality. Thus, it is possible to improve the quality of stereoscopic display when the data is adapted to take the form as shown in FIG. 7A.

Depending on the stereoscopic display format of a client 11, there are some cases where the image data to be finally displayed on the display unit 14 takes a form of strips of left eye viewpoint image data L and strips of right eye viewpoint image data R being alternated with each other every line as shown in FIG. 7C (for lenticular mode, parallax barrier mode and the like). In such a case, however, it is preferred that the image data to be coded takes the form as shown in FIG. 7A. The reason is that if coding is performed on a block basis as in DCT, the image data having the form as shown in FIG. 7C will present weak correlation between adjacent pixels, hence high spatial frequencies, producing poor compression efficiency. The same method can be applied for the cases where the number of viewpoints is greater than 2.

When images of data for a plurality of viewpoints are joined to form a piece of image data made of a single image as shown in FIG. 7A, it is impossible to know the difference between normal two-dimensional image data and stereoscopic image data from a format point of view. No problem will occur when real-time streaming is handled using the system shown in FIG. 1 because image data is transmitted in real time in accordance with the request from the client side. However, in a case where the thus transmitted image data has been once recorded locally on the client 11 side and is played afterward, it is impossible to distinguish whether it is of two-dimensional image data or stereoscopic image data. In order to prevent this, when any piece of image data having the form as shown in FIG. 7A is recorded, a flag for identification indicating whether the image data is of two-dimensional image data or stereoscopic image data may and should be added (identification information adding means). This addition of the identification flag may be done either on server 1 or client 11. Further, client 11 has a judgment means for distinction between two-dimensional image data or stereoscopic image data.

In connection with the above, when client 11 records image data locally, the recording means should be placed before decoding (upstream of decoder 12) or after image processing (downstream of the image processor).

Figure 9:
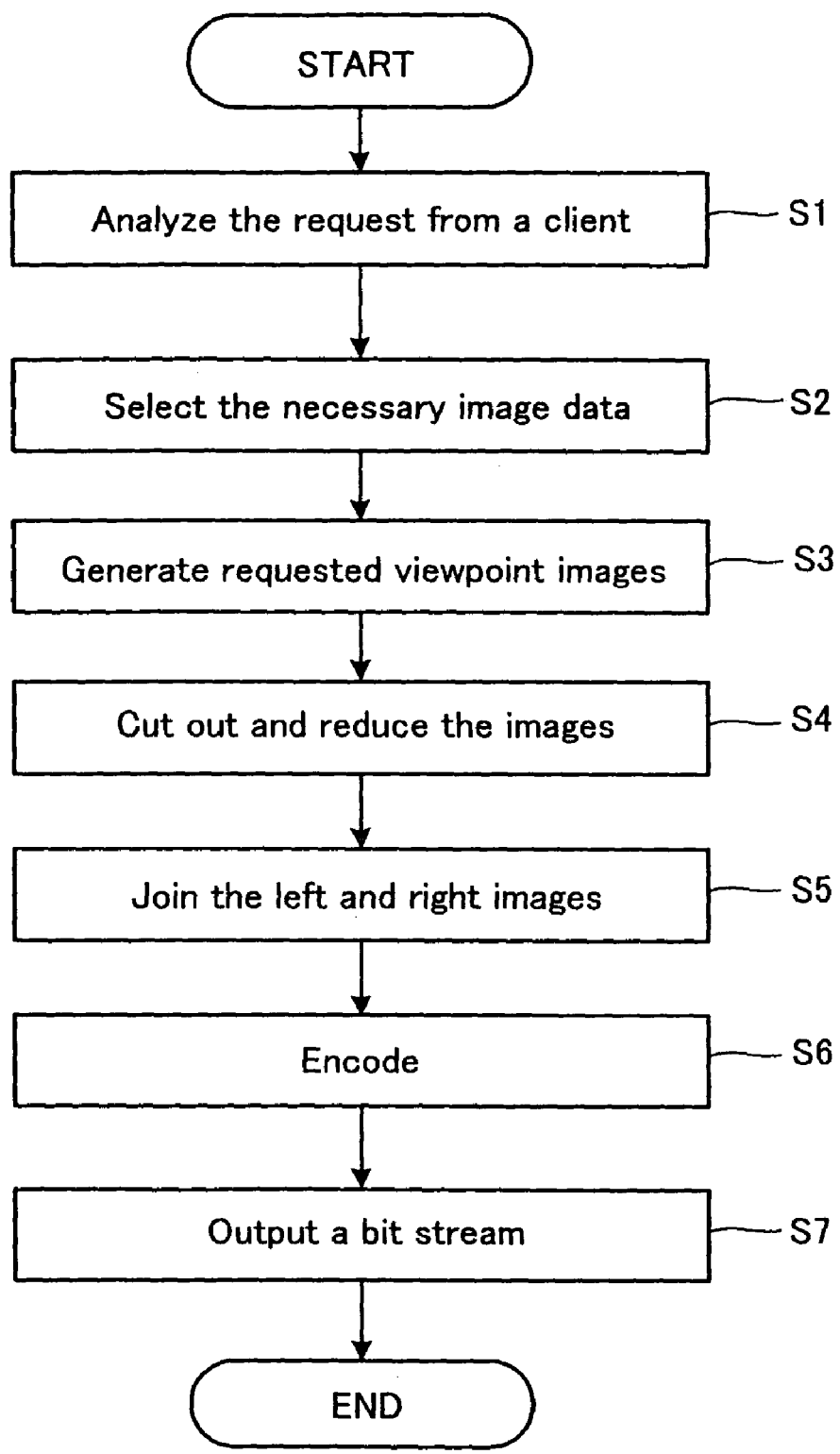
FIG. 9 is a flowchart showing the sequence of processing on a server.

FIG. 9 is a flowchart showing the sequence of processing on server 1. First, the request from a client is analyzed (Step S1). Then, the necessary image data is selected from multiple viewpoint image data (Step S2). Next, an image from the requested viewpoint is generated based on the selected data (Step S3). Subsequently, the image data of a size required for display is cut out (and reduced as required) (Step S4). Then, the cutout left eye viewpoint image data and the cutout right eye viewpoint image data are joined (Step S5). Next, the joined image data is encoded (Step S6). Finally, the data is output as a bit stream (Step S7).

Figure 10:
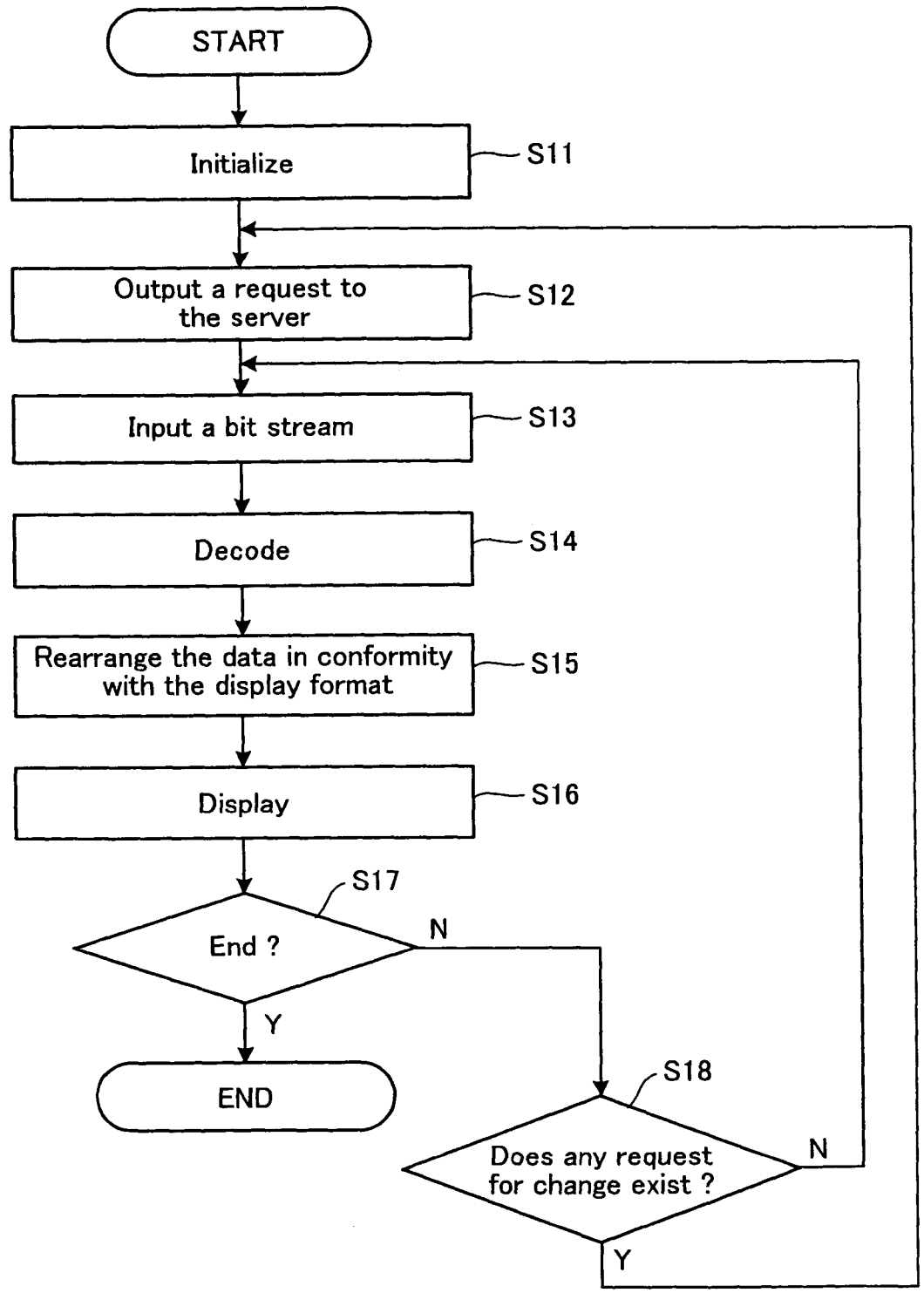
FIG. 10 is a flowchart showing the sequence of processing on a client.

FIG. 10 is a flowchart showing the sequence of processing on client 11. First, initialization is done so that the viewpoint position (viewpoint information) at the initial state and information not dependent on the viewpoint (stereoscopic display format, resolution etc. (display unit information)) are set up (Step S11). Next, these pieces of information are transmitted as a request to server 1 (Step S12). Then, the bit stream (image data) meeting the request is transmitted from the server by way of the network (Step S13). Subsequently, the bit stream is decoded (Step S14). Since, as shown in FIG. 7A the decoded image data is not in the form that is directly and stereoscopically displayable, the data is rearranged so as to conform with the stereoscopic display format, as shown in FIG. 7C (Step S15). Then the data is displayed on display unit 14 (Step S16). Next, it is judged whether there is a next display (Step S17). If display is continued, it is judged whether there is a request for change of the viewpoint (Step S18). Subsequently, if the viewpoint should be changed, the request is sent again to server 1 and the operation returns to Step S12. When no more display is needed at Step S18, the operation goes to Step S13.

Figure 14:
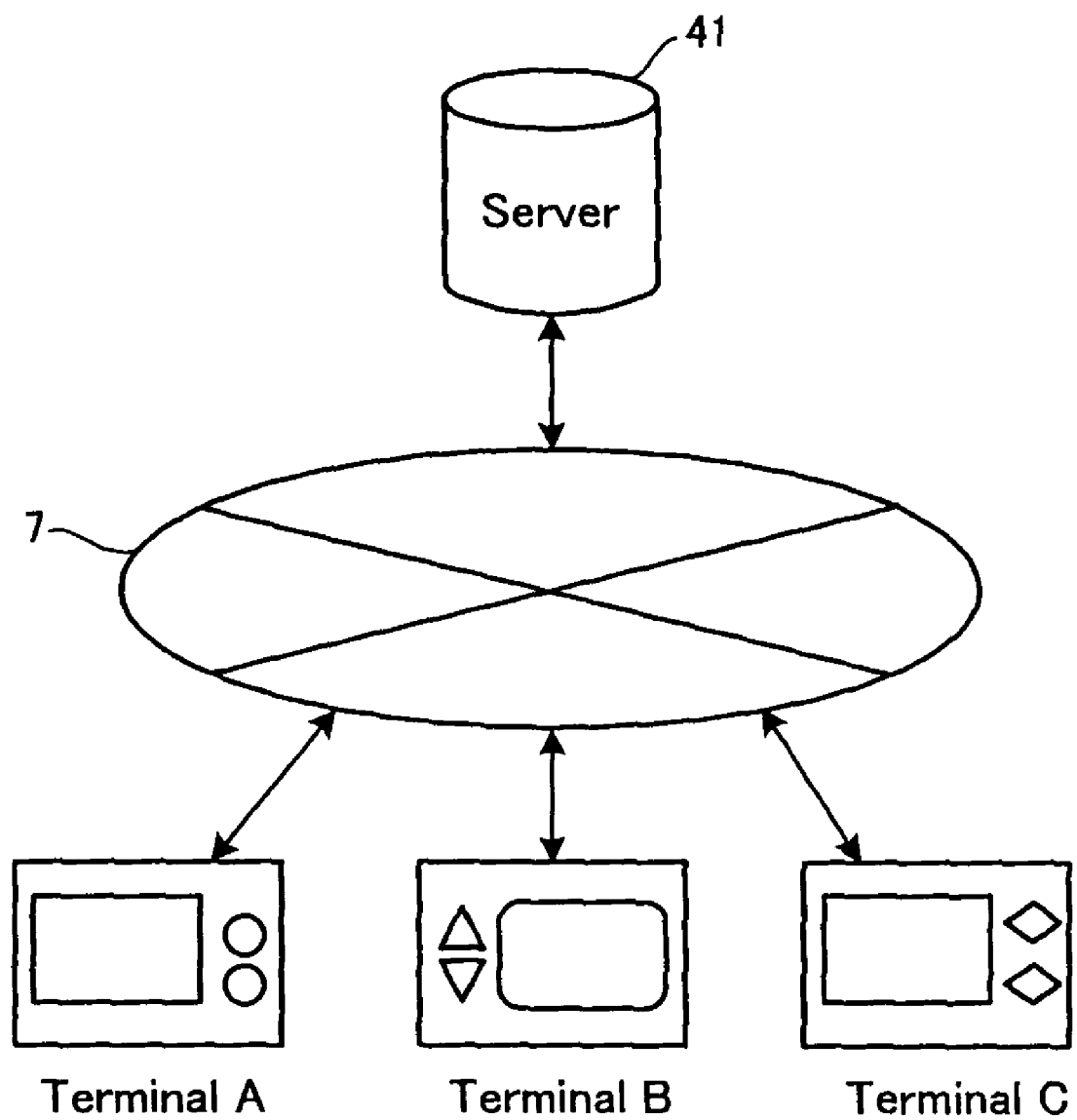
FIG. 14 shows an expected connection state between a server and clients in the present embodiment.

FIG. 14 shows an expected connection state between a server and clients in this embodiment. Terminals A to C are the clients and are connected to a server 41 via a network 7. Each terminal has a stereoscopic display format and a display resolution different from others, and the position of the viewpoint for observation is different from others. Therefore, server 41, in accordance with the request from each terminal, transmits to the terminal different image data from the others. If the whole multiple viewpoint image data stored (recorded) on server 41 is transmitted to the network so as to permit each terminal to choose the necessary data to display, transmission can be done with one kind of image data. However, since the multiple viewpoint image data is composed of a massive amount of data and because of bandwidth limitations of the network, such a transmission is unfeasible. This is why the transmission system of the present invention in which the server can transmit appropriate image data in accordance with the request from a client is requisite to an environment in which different kinds of terminals are connected to a network.

Figure 15:
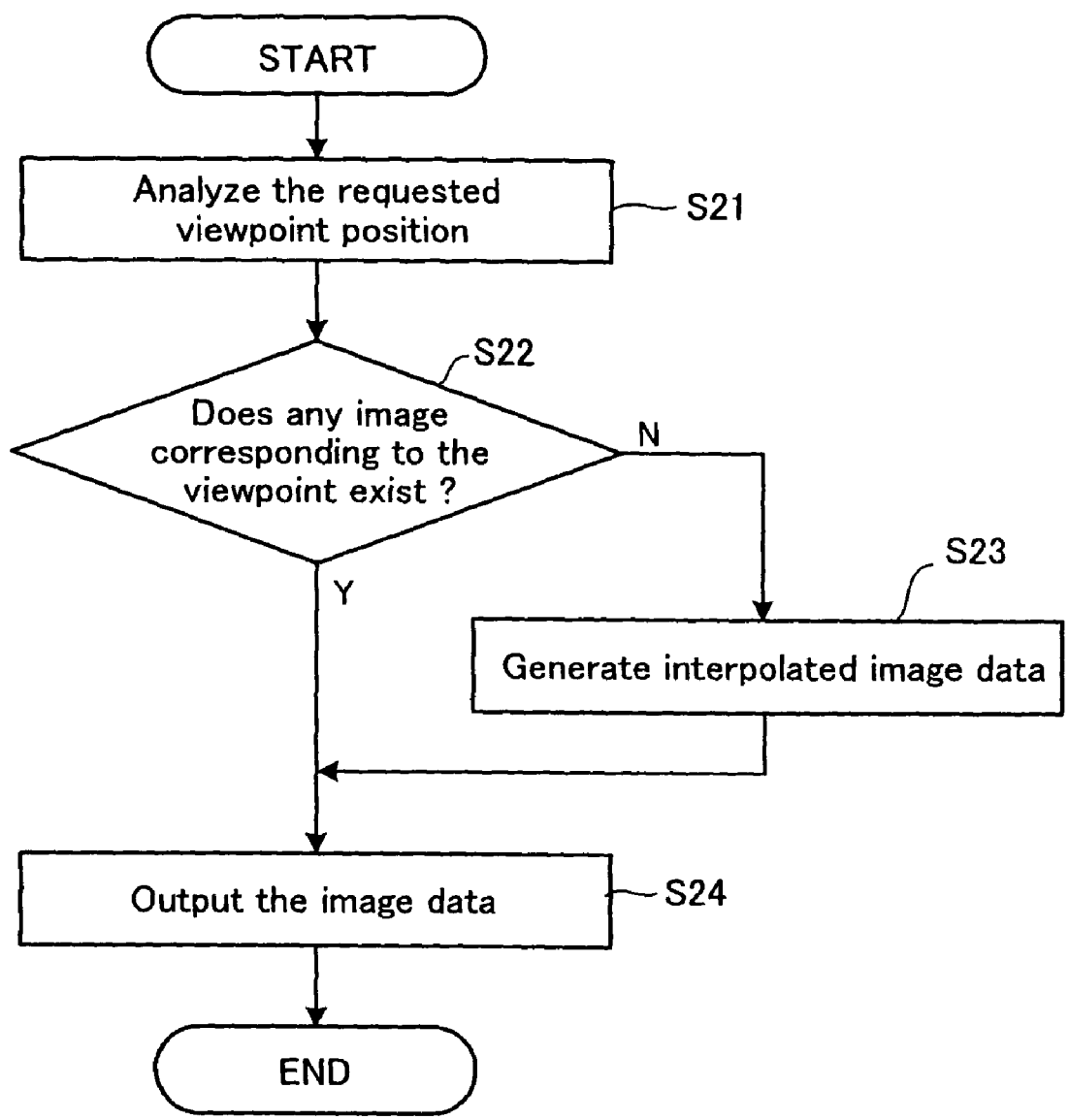
FIG. 15 is a flowchart showing details of the processing of an image generator.
Figure 16:
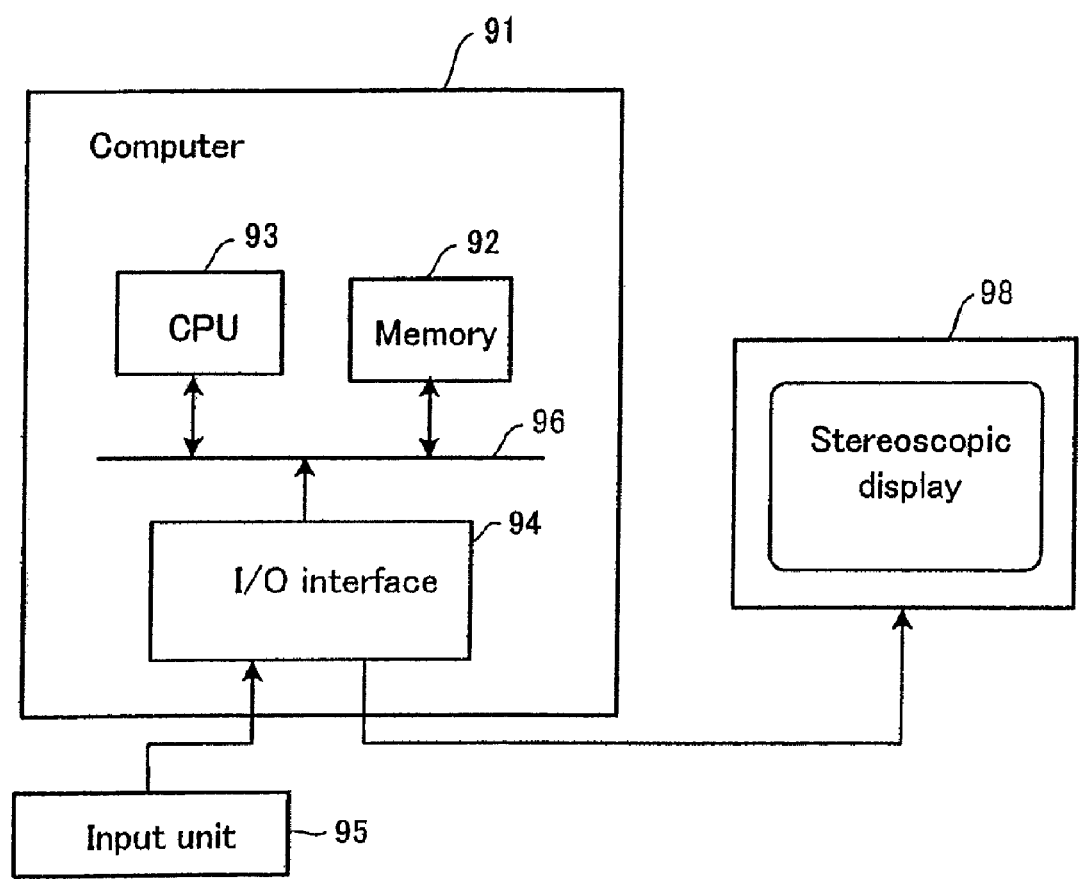
FIG. 16 is a diagram showing a conventional example.

FIG. 15 is a flowchart showing details of the processing in the image generator 3. First, the position of the viewpoint requested from a client is analyzed (Step S21). Next, it is judged whether there is any image whose viewpoint corresponds to the requested viewpoint, among the stored multiple viewpoint image data (Step S22). If there is, the image data is directly used; otherwise the interpolation image is generated (Step S23). Subsequently, the data is output as the image data (Step S24).

Next, management information will be described.

Figures 11, 12:
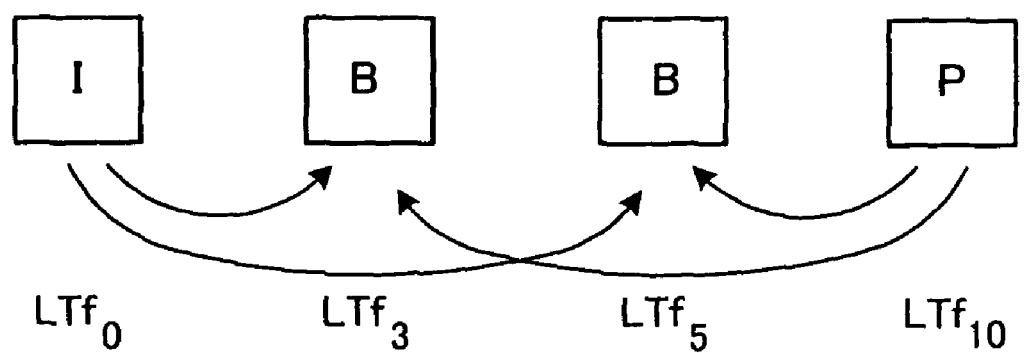
FIG. 11 is an illustration showing an example of coding multiple viewpoint moving picture data based on MPEG-4.
FIG. 12 is a diagram showing multiple viewpoint image data added with management information.

FIG. 11 shows one example of coding a multiple viewpoint moving picture based on MPEG-4. Since frame skipping can be used with MPEG-4, the frames to be coded have discontinuous frame numbers such as LTf0, LTf3, LTf5 and LTf10. Further, in this example, LTf0 is assumed to be coded as an intra frame coding frame (I-frame), LTf10 is assumed to be coded as a frame (P-frame) which is predictive coded based on the decoded frame of LTf0, and LTf3 and LTf5 are assumed to be coded as frames (B-frames) which are bi-directionally predictive coded based on the decoded frames of LTf0 and LTf10.

FIGS. 13A and 13B are charts showing one example of management information added at management information generator 32 shown in FIG. 8A. The coded data of individual camera images can be joined to management information as shown in FIG. 12 and stored. This management information is the information that allows for access to each camera image data. In the case of a multiple viewpoint moving picture, the management information contains not only the information which allows for access to each camera image but also the information which allows random access to the coded data at a designated time within each camera image data.

FIG. 13A shows one example of management information for access to the coded data of individual camera images. For example, it is indicated that the coded data of camera image C2 exists at the B2-th byte from the front of the data in FIG. 12. FIG. 13A further includes the pointers to the information for making access to the coded data at designated times within the camera image data. For the coded data of C2, it is indicated that the access table for making access to the coded data at designated times is located at address P2 within the management information.

FIG. 13B shows one example of an access table to coded data at designated times. Times t1, t2, t3, . . . may be set up at regular intervals or may be set up arbitrary intervals apart. For example, it is indicated that the coded data corresponding to time t3 exists at the Bt3-th byte from the front of the coded data of the camera image while the coded data of I-frame is located at a position upstream by It3 bytes from the aforementioned position. If the decoder needs to start display from time t3, the coded data of the I-frame located at the (Bt3-It3)-th byte from the front is decoded first. Then, P-frames and B-frames are successively decoded while counting the number of bytes of the decoded data until the count reaches It3 bytes. When the display is started at this point of time, the image data from the designated time t3 is displayed.

Next, other accessing methods will be described.

(A) Coded data is packetized and the header information of each packet has information that indicates whether the packet contains the front of an I-frame. In FIG. 13B, the designated time and the number of bytes to the packet corresponding to the designated time are written. When the decoder had made access to the packet corresponding to the designated time t3, it is checked as to whether the packet contains the front of an I-frame. The decoder starts decoding and display from a packet that contains an I-frame (all the packets before that are discarded as unnecessary).

(B) In (A), instead of indicating the number of bytes to the packet, only the packet number is written in FIG. 13B. The length of the packets in a piece of coded data is assumed to be fixed and the number of bytes of one packet is written in the header information of the coded data. The decoder calculates the number of bytes to the packet corresponding to the designated time based on the packet number and the number of bytes of one packet (thereafter the steps are the same as (A)).

Next, other storage forms will be described.

(C) In FIG. 12, the management information and the coded information are joined and stored. However, the management information may be separated and stored as a different file.

(D) Of the management information, the information for access to designated times may be included in the header information of the coded data of each camera image, instead of being included in the management information. In this case, the third column in FIG. 13A (the pointer to the information for access to designated times within each camera image) is not necessary.

(E) The management information, the coded data of individual camera images may be all separated into different files.

In this case, the number of bytes from the front in the second column in FIG. 13A is replaced by the filename of the coded data of each camera image, for example. Access to each camera image is made based on the filename.

INDUSTRIAL APPLICABILITY

The image data distribution system, its image data transmitting apparatus and image data receiving apparatus according to the present invention does not need large amounts of memory and a high-performance CPU on the client side, and can be applied to mobile terminals which enable observations of a stereoscopic image from arbitrary viewpoints.

The invention claimed is:

1. An image data distribution system, comprising:
   an image data transmitting apparatus that includes,
   a request information receiving unit that receives client's request information transmitted by way of a network,
   a request information analyzing unit that analyzes the request information received by the request information receiving unit,
   a multiple viewpoint image supply unit which selects necessary image data from coded and stored multiple viewpoint image data of images taken by a plurality of cameras, based on viewpoint information from the request information analyzed by the request information analyzing unit and decodes and supplies selected data,
   an image generating unit which, based on image data supplied from the multiple viewpoint image supplying unit, generates left eye viewpoint image data and right eye viewpoint image data of an image viewed from a viewpoint in conformity with the request information,
   an image synthesizing unit that synthesizes the left eye viewpoint image data and the right eye viewpoint image data generated by the image generating unit, based on display unit information from the request information, by joining the left eye viewpoint image data and the right eye viewpoint image data side-by-side,
   a coding unit that encodes image data synthesized by the image synthesizing unit,
   a transmitting unit that transmits the encoded image data to the network; and
   an image data receiving apparatus that includes,
   a receiving unit that receives the encoded image data via the network,
   a decoding unit that decodes the encoded image data received by the receiving unit,
   an image processing unit that processes the decoded image data into a stereoscopic display format so as to be displayable on a display unit, the display unit displaying image data processed by the image processing unit,
   a request information input unit that allows input of the client's request information, and
   a request information transmitting unit that transmits the request information to the network.

2. An image data transmitting apparatus, comprising:
   a request information receiving unit that receives client's request information transmitted by way of a network;
   a request information analyzing unit that analyzes the request information received by the request information receiving unit;
   a multiple viewpoint image supply unit which selects necessary image data from coded and stored multiple viewpoint image data of images taken by a plurality of cameras, based on viewpoint information from the request information analyzed by the request information analyzing unit and decodes and supplies selected data;
   an image generating unit which, based on image data supplied from the multiple viewpoint image supplying unit, generates left eye viewpoint image data and right eye viewpoint image data of an image viewed from a viewpoint in conformity with the request information;
   an image synthesizing unit that synthesizes the left eye viewpoint image data and the right eye viewpoint image data generated by the image generating unit, based on display unit information from the request information, by joining the left eye viewpoint image data and the right eye viewpoint image data side-by-side;
   a coding unit that encodes image data synthesized by the image synthesizing unit; and
   a transmitting unit that transmits the encoded image data to the network.

3. An image data distributing system, comprising:
   an image data transmitting apparatus that includes,
   a request information receiving unit that receives client's request information transmitted by way of a network,
   a request information analyzing unit that analyzes the request information received by the request information receiving unit,
   a multiple viewpoint image supply unit which selects necessary image data from coded and stored multiple viewpoint image data of images taken by a plurality of cameras, based on viewpoint information from the request information analyzed by the request information analyzing unit and decodes and supplies selected data,
   an image generating unit which, based on image data su lied from the multiple viewpoint image supplying unit, generates left eye viewpoint image data and right eye viewpoint image data of an image viewed from a viewpoint in conformity with the request information,
   an image synthesizing unit that synthesizes the left eye viewpoint image data and the right eye viewpoint image data generated by the image generating unit, based on display unit information from the request information, by joining the left eye viewpoint image data and the right eye viewpoint image data side-by-side,
   a coding unit that encodes image data synthesized by the image synthesizing unit,
   a transmitting unit that transmits the encoded image data to the network; and
   an image data receiving apparatus that includes,
   a receiving unit that receives the encoded image data via the network,
   a decoding unit that decodes the encoded image data received by the receiving unit,
   an image processing unit that processes the decoded image data into a stereoscopic display format so as to be displayable on a display unit, the display unit displaying image data processed by the image processing unit,
   a request information input unit that allows input of the client's request information, and
   a request information transmitting unit that transmits the request information to the network,
   the image data transmitting apparatus, further comprising:

a management information adding unit that adds management information for enabling access to the image data of individual viewpoints and random access, to the multiple viewpoint image data.

4. An image data transmitting apparatus, comprising:
a request information receiving unit that receives client's request information transmitted by way of a network;
a request information analyzing unit that analyzes the request information received by the request information receiving unit;
a multiple viewpoint image supply unit which selects necessary image data from coded and stored multiple viewpoint image data of images taken by a plurality of cameras, based on viewpoint information from the request information analyzed by the request information analyzing unit and decodes and supplies selected data;
an image generating unit which, based on image data supplied from the multiple viewpoint image supplying unit, generates left eye viewpoint image data and right eye viewpoint image data of an image viewed from a viewpoint in conformity with the request information;
an image synthesizing unit that synthesizes the left eye viewpoint image data and the right eye viewpoint image data generated by the image generating unit, based on display unit information from the request information, by joining the left eye viewpoint image data and the right eye viewpoint image data side-by-side;
a coding unit that encodes image data synthesized by the image synthesizing unit; and
a transmitting unit that transmits the encoded image data to the network,
the image data transmitting apparatus, further comprising:
a management information adding unit that adds management information for enabling access to the image data of individual viewpoints and random access, to the multiple viewpoint image data.

5. An image data distribution system, comprising:
an image data transmitting apparatus that include,
  a request information receiving unit that receives client's request information transmitted by way of a network,
  a request information analyzing unit that analyzes the request information received by the request information receiving unit,
  a multiple viewpoint image supply unit that supplies multiple viewpoint image data,
  an image generating unit which, based on viewpoint information from the request information analyzed by the request information analyzing unit, receives input of necessary image data from the multiple viewpoint image supply unit and generates left eye viewpoint image data and right eye viewpoint image data of an image viewed from a viewpoint in conformity with the request information,
  an image synthesizing unit that synthesizes the left eye viewpoint image data and the right eye viewpoint image data generated by the image generating unit, based on display unit information from the request information, by joining the left eye viewpoint image data and the right eye viewpoint image data side-by-side,
  a coding unit that encodes image data synthesized by the image synthesizing unit,
  a transmitting unit that transmits encoded image data to the network; and
an image data receiving apparatus that includes,
  a receiving unit that receives the encoded image data via the network,
  a decoding unit that decodes the encoded image data received by the receiving unit,
  an image processing unit that processes decoded image data into a stereoscopic display format so as to be displayable on a display unit, the display unit displaying image data processed by the image processing unit;
  a request information input unit that allows input of the client's request information,
  a request information transmitting unit that transmits the request information to the network, and
  a judgment unit that judges whether the received image data is of two-dimensional image data or stereoscopic image data.

6. An image data receiving apparatus, comprising:
a receiving unit that receives, by way of network, coded image data of an image viewed from a left eye viewpoint and a right eye viewpoint in conformity with client's request information transmitted by way of a network, the coded image data including left eye viewpoint image data and right eye viewpoint image data that have been joined side-by-side;
a decoding unit that decodes the coded image data received by the receiving unit;
an image processing unit that processes the decoded image into a stereoscopic display format so as to be displayable on a display unit, the display unit displaying image data processed by the image processing unit;
a request information input unit that allows input of request information of a client;
a request information transmitting unit that transmits the request information to the network; and
a judgment unit that judges whether the received image data is of two-dimensional image data or stereoscopic image data.

7. An image data distribution system, comprising:
an image data transmitting apparatus that includes,
  a request information receiving unit that receives client's request information transmitted by way of a network,
  a request information analyzing unit that analyzes the request information received by the request information receiving unit,
  a multiple viewpoint image supply unit that supplies multiple viewpoint image data,
  an image generating unit which, based on viewpoint information from the request information analyzed by the request information analyzing unit, receives input of necessary image data from the multiple viewpoint image supply unit and generates left eye viewpoint image data and right eye viewpoint image data of an image viewed from a viewpoint in conformity with the request information,
  an image synthesizing unit that synthesizes the left eye viewpoint image data and the right eye viewpoint image data generated by the image generating unit, based on display unit information from the request information, by joining the left eye viewpoint image data and the right eye viewpoint image data side-by-side,
  a coding unit that encodes image data synthesized by the image synthesizing unit, and
a transmitting unit that transmits the encoded image data to the network; and
  an image data receiving apparatus that includes, a receiving unit that receives the encoded image data via the network, a decoding unit that decodes the encoded image data received by the receiving unit, an image processing unit that processes the decoded image data into a stereoscopic display format so as to be displayable on a display unit, the display unit displaying image data processed by the image processing unit, a request information input unit that allows input of the client's request information, a request information transmitting unit that transmits the request information to the network, and an identification information adding unit that adds to the image data to be transmitted a piece of information that indicates whether the image data is of two-dimensional image data or stereoscopic image data.

8. An image data transmitting apparatus, comprising:

a request information receiving unit that receives client's request information transmitted by way of a network;

a request information analyzing unit that analyzes the request information received by the request information receiving unit;

a multiple viewpoint image supply unit that supplies multiple viewpoint image data;

an image generating unit which, based on viewpoint information from the request information analyzed by the request information analyzing unit, receives input of necessary image data from the multiple viewpoint image supply unit and generates left eye viewpoint image data and right eye viewpoint image data of an image viewed from a viewpoint in conformity with the request information;

an image synthesizing unit that synthesizes the left eye viewpoint image data and the right eye viewpoint image data generated by the image generating unit, based on display unit information from the request information, by joining the left eye viewpoint image data and the right eye viewpoint image data side-by-side;

a coding unit that encodes image data synthesized by the image synthesizing unit;

a transmitting unit that transmits the encoded image data to the network; and an identification information adding unit that adds to the image data to be transmitted a piece of information that indicates whether the image data is of two-dimensional image data or stereoscopic image data.

9. An image data receiving apparatus, comprising;

a receiving unit that receives, by way of a network, coded image data of an image viewed from a left eye viewpoint and a right eye in conformity with client's request information transmitted by way of a network, the coded image data including left eye viewpoint image data and right eye viewpoint image data that have been joined side-by-side;

a decoding unit that decodes the coded image data received by the receiving unit;

an image processing unit that processes the decoded image data into a stereoscopic display format so as to be displayable on a display unit, the display unit displaying image data processed by the image processing unit;

a request information input unit that allows input of request information of a client;

a request information transmitting unit that transmits the request information to the network; and an identification information adding unit that adds to the received image data a piece of information that indicates whether the image data is of two-dimensional image data or stereoscopic image data.

* * * * *